H. WILSON.
THRUST BEARING FOR PROPELLER SHAFTS OF SHIPS.
APPLICATION FILED JUNE 1, 1912.

1,094,620.

Patented Apr. 28, 1914.
2 SHEETS—SHEET 1.

WITNESSES
W. Ray Taylor
Anna Heigis

INVENTOR
Hugh Wilson
BY Geyer & Popp
ATTORNEYS

H. WILSON.
THRUST BEARING FOR PROPELLER SHAFTS OF SHIPS.
APPLICATION FILED JUNE 1, 1912.
1,094,620.
Patented Apr. 28, 1914.
2 SHEETS—SHEET 2.
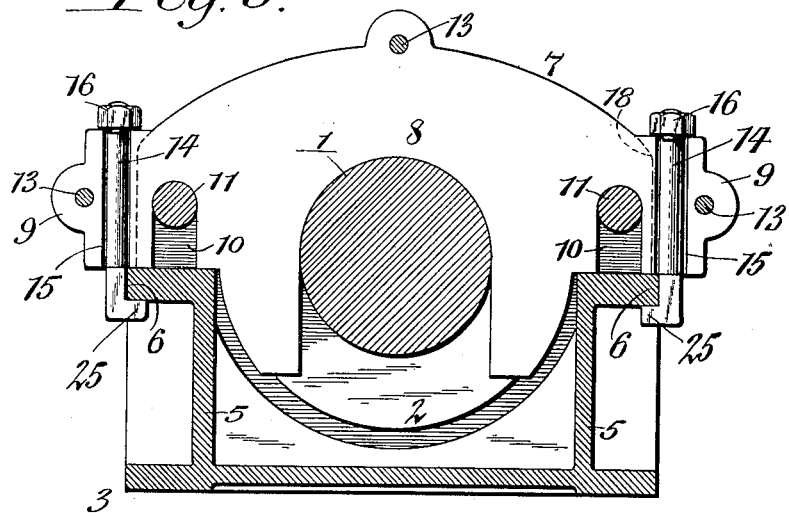
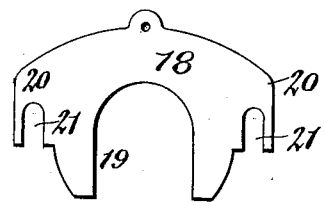
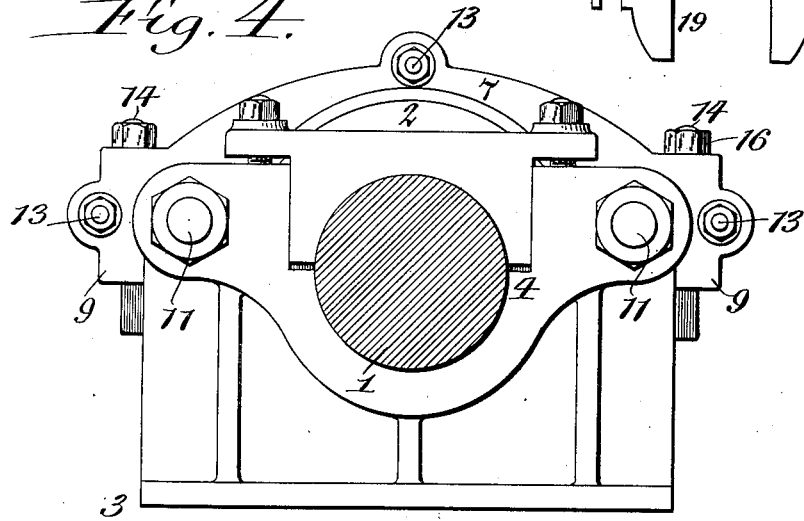
WITNESSES
W. Ray Taylor
Anna Heigis
INVENTOR
Hugh Wilson
BY Geyer & Pohlf
ATTORNEYS

UNITED STATES PATENT OFFICE.

HUGH WILSON, OF BUFFALO, NEW YORK.

THRUST-BEARING FOR PROPELLER-SHAFTS OF SHIPS.

1,094,620.  Specification of Letters Patent.  Patented Apr. 28, 1914.

Application filed June 1, 1912.   Serial No. 700,910.

*To all whom it may concern:*

Be it known that I, HUGH WILSON, a citizen of the United States, residing at Buffalo, in the county of Erie and State of New York, have invented new and useful Improvements in Thrust-Bearings for Propeller-Shafts of Ships, of which the following is a specification.

This invention relates to thrust bearings for the propeller shafts of ships, and other uses. In thrust bearings of this character, as heretofore constructed, no means were provided for taking up the wear except by re-babbitting the faces of the yokes which are engaged by the collars on the shaft, which operation requires considerable time and therefore is undertaken only at long intervals, thereby resulting in considerable wear in the bearings and undue pounding of the shafts due to the slack between the bearing and shaft before this wear is taken up.

It is the object of this invention to provide a thrust bearing of this character in which the wear upon the opposing surfaces of the shaft collars and the yokes of the bearing block can be taken up very quickly and without stopping the operation of the engine for any considerable time, thereby avoiding the wear and tear which otherwise is produced by the pounding of the shaft and thereby prolonging the life of the bearing accordingly.

Figure 1:
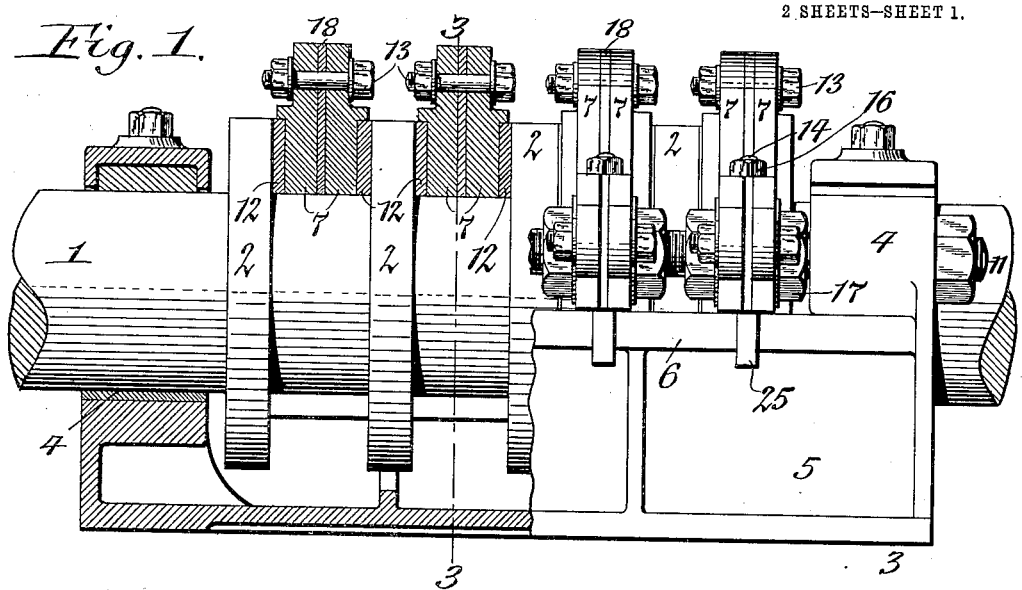
Figure 2:
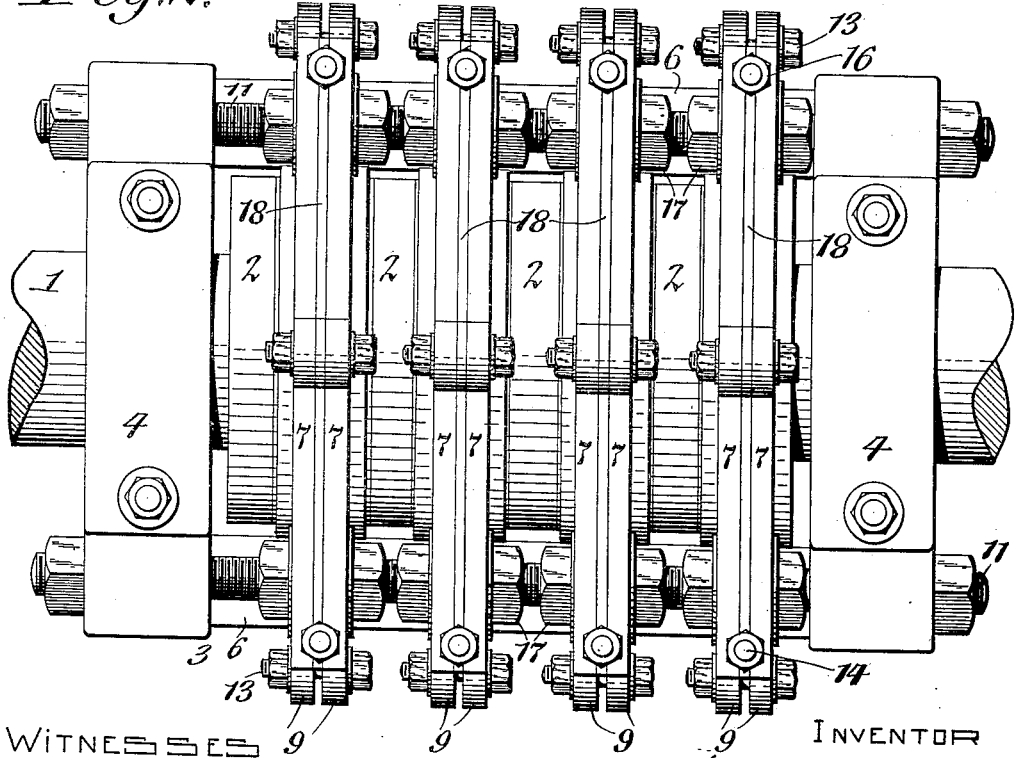

In the accompanying drawings consisting of 2 sheets: Figure 1 is a side elevation, partly in section, of a thrust bearing for propeller shafts embodying my improvements. Fig. 2 is a top plan view thereof. Fig. 3 is a transverse vertical section taken in line 3—3, Fig. 1. Fig. 4 is an end elevation of the thrust bearing with the shaft journaled therein represented in section. Fig. 5 is a detached view of the take up filling piece.

Similar characters of reference indicate corresponding parts throughout the several views.

1 represents the usual propeller shaft of the ship provided with a plurality of annual thrust collars 2 which are spaced apart at suitable intervals on the shaft and preferably formed integrally thereon. Although the number of such collars may be varied according to the load which is to be imposed upon the same the drawings show four of such collars as an example.

3 represents the bearing block which is secured to the frame work of the ship and which is provided with a base 2, two bearings 4, 4 at the front and rear ends of the base in which the shaft is journaled at opposite ends of the series of thrust collars thereon, and two longitudinal walls 5 projecting upwardly from the base at opposite longitudinal edges thereof and connecting the corresponding ends of the bearings, each upright wall being provided at its upper edge with an outwardly projecting horizontal holding flange 6.

For the purpose of taking up the longitudinal thrust upon the propeller shaft when the ship is moving either forward or backward a plurality of yokes are employed one of said yokes being placed between the opposing sides of two adjacent collars of the shaft and a similar yoke being arranged to engage with the front side of the foremost thrust collar, as shown in Figs. 1 and 2. Each of these yokes is divided in a direction crosswise of the bearing block and propeller shaft into two sections 7, 7, each of these sections having a central part 8 which is substantially U-shaped or horseshoe-shaped in form and adapted to be passed over the shaft so that its legs straddle the same, and two laterally projecting arms 9 which rest on top of the side walls of the bearing block. Each of these arms is provided in its lower edge with a downwardly opening notch or slot 10 which is adapted to receive a threaded longitudinal tie rod 11 two of which are arranged on opposite sides of the shaft and parallel therewith and each connected at its front and rear ends with the corresponding ends of the front and rear shaft bearings. The outer faces of each pair of yoke sections are provided with linings or facings 12 of babbitt which engage with the corresponding opposing faces of adjacent collars on the shaft. The two sections of each yoke are connected with each other preferably at the top and at the sides thereof by means of horizontal bolts 13 passing through registered openings in the sections. These sections are firmly clamped down upon the bearing block by two clamping bolts 14 each of which has its body arranged vertically in grooves 15 formed in the opposing inner sides of the corresponding supporting arms of these sections, the lower end of each of these clamping bolts being constructed in the form of a hook 25 which engages underneath the adjacent clamping flange of the bearing block while its upper end is provided with a screw nut 16 engaging with the upper edges of the corresponding arms of a pair of yoke sections, as shown in Figs. 2 and 3.

The several yokes are held against lengthwise movement on the bearing block by means of screw nuts 17 arranged upon the threaded tie rods 11 and engaging with the outer sides of the supporting arms of the yoke sections so as to securely fasten these yokes to the tie rods and prevent the same from moving lengthwise relatively to the bearing block. By this means a plurality of thrust shoulders are provided for the shaft to enable the same to take the longitudinal strains to which the same is subjected either while the ship is going ahead or backing up.

When sufficient slack is produced between the collars of the shaft and the yokes due to wear upon the opposing surfaces of these parts which makes it desirable to take up the wear in order to avoid pounding and racking of the parts, this is accomplished by loosening the bolts 14 which connect the yokes with the bearing block, also loosening or removing the bolts 13 which connect the yoke sections in pairs and also slackening the nuts 17 on the tie rods. When thus loosened the sections of each yoke are spread apart so that their outer sides engage firmly against the opposing faces of the thrust collars on the shaft and then filling pieces or shims 18 of tin or other suitable material are placed between the sections of each yoke so as to hold the same apart and close to the adjacent collars of the shaft. These shims or filling pieces are preferably of the same general shape as the yokes and are provided with a horseshoe-shaped central part 19 which straddles the propeller shaft between the companion pair of yoke sections and two side arms 20 which are provided in their lower edges with notches 21 whereby the same straddle the two tie rods, as shown in Fig. 3. These shims, as shown in the last mentioned figure, terminate short of the vertical grooves 15 in the yoke sections so as not to interfere with the bolts 14 arranged in these grooves. If desired, the upper central bolt 13 of each pair of yoke sections may pass through the upper part of the shim in which case this bolt must be removed from these sections in order to permit of placing the shim between these sections. After the sections of the several pairs of yokes have been spread the required extent and the shims have been placed between the companion sections for taking up the wear to the desired extent the bolts 13 which connect the sections of each yoke are tightened, the nuts 17 on the tie rods are tightened so as to hold them against longitudinal displacement, and the clamping bolts 14 are tightened for holding the yokes down upon the bearing block. Inasmuch as the introduction of these shims or filling pieces can be effected very quickly the engine need be shut down only a comparatively short time whereby interruption in the use of the boat is reduced to a minimum and running of a boat is possible without undue slack in the thrust bearing and without liability of unduly racking or wearing this bearing which otherwise would result if the taking up of the wear in the thrust bearing is deferred an undue length of time.

I claim as my invention:

1. The combination of a bearing block having fixed bearings at its opposite ends, a shaft normally incapable of axial movement and journaled in said bearings and provided between said bearings with a plurality of thrust collars, a plurality of yokes each of which comprises two sections which are arranged transversely between two adjacent collars, adjusting means arranged between the sections of each yoke and operating to move one of these sections in one direction for engaging one of the collars and the other section in the opposite direction for engaging the opposing collar, and means for connecting said yoke sections and adjusting means with fixed supports.

2. The combination of a bearing block having fixed bearings at its opposite ends, a shaft journaled in said bearings and provided between said bearings with a plurality of thrust collars, a plurality of horseshoe yokes each of which comprises two sections which are arranged transversely between two adjacent collars, a horseshoe filling piece arranged between the sections of each yoke for separating the same and holding the outer sides thereof in engagement with the opposing faces of the respective collars, and means for connecting the yoke sections with said bearings, and with each other comprising longitudinal tie rods arranged on opposite sides of the collars and shaft and connected at their ends with said bearings while their intermediate parts pass through openings in the opposite ends of said yoke sections, and screw nuts arranged on said tie rods and bearing against the outer sides of the yoke sections.

3. The combination of a bearing block having bearings at its opposite ends and longitudinal flanges at its opposite sides, a shaft journaled in said bearings and having a plurality of thrust collars, tie rods arranged on opposite sides of the shaft and connecting corresponding ends of the bearings, yokes arranged transversely between adjacent collars and each comprising two sections which straddle the shaft and tie rods, a filling piece arranged between each pair of yoke sections, screw nuts arranged on said tie rods and engaging with the outer sides of the yoke sections, clamping screws arranged between said yoke sections and having hooks at their lower ends which engage said flanges and nuts at their upper ends which engage the upper edges of said yoke sections, and bolts connecting the sections of the yoke with each other.

Witness my hand this 28th day of May, 1912.

HUGH WILSON.

Witnesses:
JOHN W. MARK,
JOHN W. RAINEY.

Copies of this patent may be obtained for five cents each, by addressing the "Commissioner of Patents, Washington, D. C."